United States Patent [19]

Gilli et al.

[11] Patent Number: 4,618,758
[45] Date of Patent: Oct. 21, 1986

[54] FOCUSING HEAD FOR A LASER-BEAM CUTTING MACHINE

[75] Inventors: Luigi Gilli; Domenico Peiretti, both of Turin, Italy

[73] Assignee: Prima Industrie S.p.A., Italy

[21] Appl. No.: 736,649

[22] Filed: May 21, 1985

[30] Foreign Application Priority Data

May 22, 1984 [IT] Italy ............................ 67512 A/84

[51] Int. Cl.⁴ .......................................... B23K 26/00
[52] U.S. Cl. ...................... 219/121 LG; 219/121 LZ; 219/121 FS
[58] Field of Search ..... 219/121 LM, 121 L, 121 LX, 219/121 LU, 121 FS, 121 PU, 121 PT, 124.02

[56] References Cited

U.S. PATENT DOCUMENTS

| 3,992,819 | 11/1972 | Schmall | 219/121 L X |
| 4,083,629 | 4/1978 | Kocher et al. | 219/121 FS |
| 4,284,871 | 8/1981 | Mawson et al. | 219/121 PV |
| 4,334,139 | 6/1982 | Wittekoek et al. | 219/121 L X |
| 4,415,795 | 11/1983 | Ross et al. | 219/121 PV |
| 4,536,639 | 8/1985 | Crahay | 219/121 L X |

Primary Examiner—M. H. Paschall
Attorney, Agent, or Firm—Wigman & Cohen

[57] ABSTRACT

The present invention relates to a focusing head 1 for a laser-beam cutting machine on which the head is designed to turn, in relation to the machine structure 4, around two axes combining to form an angle, the head consisting of two portions 15, 24 one of which 24 is provided with an output nozzle 43 and a focusing lens 42 and moves axially in relation to the other by means of a servomechanism 49 controlled by a position sensor 46 in sliding contact with the sheet material 3 being cut, the sensor 46 being tubular, being assembled in sliding manner on to the end of the nozzle 43 and constituting a guide for a cover gas.

6 Claims, 4 Drawing Figures

FOCUSING HEAD FOR A LASER-BEAM CUTTING MACHINE

BACKGROUND OF THE INVENTION

The present invention relates to a focusing head for a laser-beam cutting machine particularly suitable for cutting sheet metal or similar sheet materials.

We are already familiar with focusing heads connected to an articulated, powered supporting structure enabling the said head to travel along a given path, which on sophisticated types of machines may even be three-dimensional, for cutting flat or any type of drawn sheet metal into any shape whatsoever. Though the lasers used on the abovementioned machines have reached an extremely high degree of perfection, enabling perfect cutting of very thick sheet metal or similar sheet materials, nevertheless, cases are still encountered in which cutting quality fails to meet the required standard in terms of neatness and precision.

The abovementioned defects, which do not usually depend on the focusing head, are a direct consequence of inevitable, randomly distributed ripples in the sheet which cannot be compensated for in the head operating programme and, consequently, account for a large part of the trouble. In fact, in the presence of the ripples, the beam from the end nozzle on the laser head is so poorly focused on the sheet being cut that only part of the energy in the laser beam is transmitted to the sheet.

SUMMARY OF THE INVENTION

The aim of the present invention is to provide a focusing head enabling highly accurate elimination, by means of adaptive focal displacement, of disturbance caused by local defects on the sheet being cut.

With this aim in view, the present invention relates to a focusing head for a laser-beam cutting machine comprising a moving structure, the said head comprising a focusing lens and an output nozzle, integral with each other, and being connectable to the said structure so as to move, in relation to the same, around two axes combining to form an angle, so as to move the said nozzle along any path and keep the said lens, in operation, at a given constant theoretical distance from the surface of the sheet material, particularly sheet metal, being cut. The head comprises a first and second portion moving, in mutual manner, axially parallel to the optical axis of the said lens and to the axis of the said nozzle. One of the said two portions comprising the said nozzle, the said lens and sensor means for sensing the distance of the said lens from the said surface of the sheet material; a servomechanism, controlled by the said sensor means, being mounted between the said two portions for moving them mutually in the said axial direction, so as to keep the said lens, in operation, at a given constant, real distance from the said surface of the said sheet material.

In a preferred arrangement of the present invention, the said sensor means comprises a position sensor in sliding contact and mounted, in axially sliding manner, on to the output end of the said nozzle and projecting from the same so as to slide, in operation, essentially contacting the said sheet material.

The abovementioned position sensor in sliding contact is preferably tubular in shape and acts as a guide for a cover gas blowing, in operation, out of the said nozzle. By remaining essentially in contact at all times with the surface of the sheet material being cut, the abovementioned preferred type of sensor prevents even the slightest variation in distance between the nozzle and the said surface from interfering with the flow of cover gas coming out of the nozzle and thus creating a swirl which could jeopardize the neatness and accuracy of the cutting operation.

BRIEF DESCRIPTION OF THE DRAWINGS

The present invention will now be described, by way of a non-limiting example, with reference to the attached drawings in which.

DESCRIPTION OF THE PREFERRED EMBODIMENTS

Figure 1:
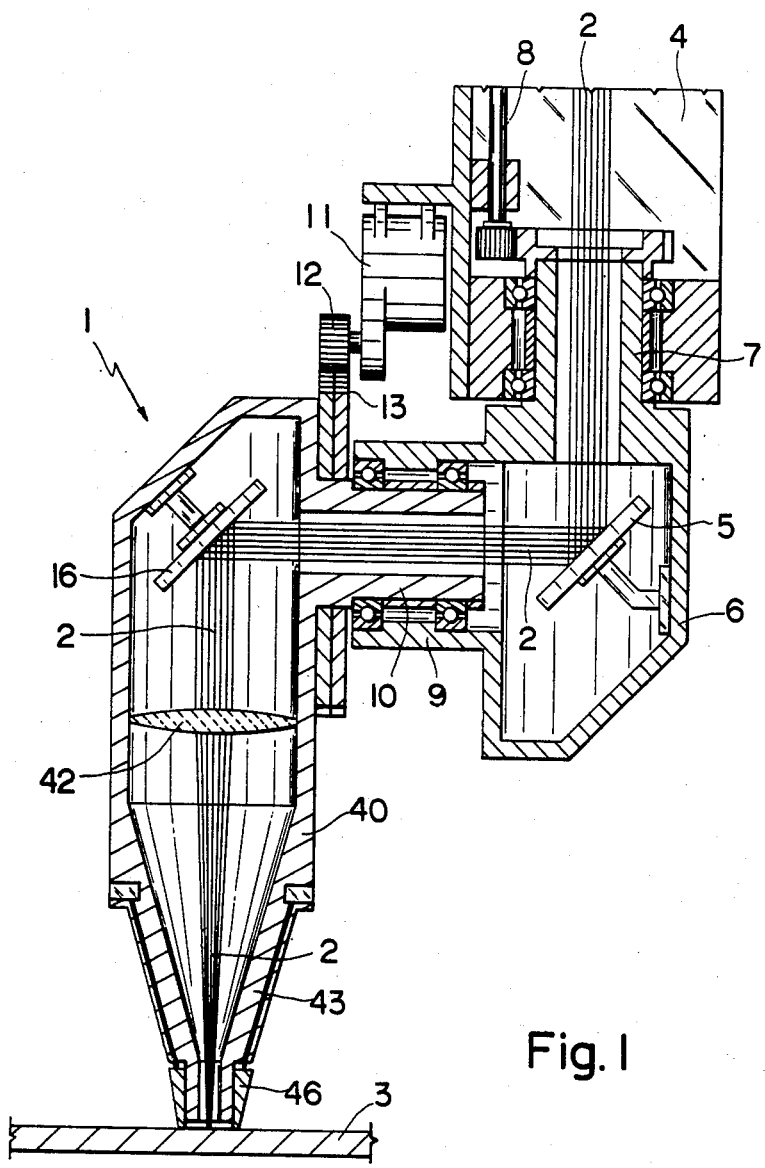
FIG. 1 shows an axial section of a cutting head according to the present invention.

Numeral 1 in FIG. 1 indicates a focusing and cutting head designed to receive a beam 2 from a laser power generator (not shown) and to focus it on to a sheet 3 resting on a work platform (not shown) set up horizontally beneath head 1. Both the latter and the platform are designed to move in relation to each other along axes X and Y perpendicular to each other and parallel to the top of the platform.

As shown in FIG. 1, head 1 is attached to the bottom end of column 4 set up perpendicular to the X and Y axes, the said axis hereinafter being referred to as the Z axis, and moved along the latter by control means not shown in the drawing. At the bottom, column 4 comprises a mirror 5 designed to receive beam 2 straight from the Z axis and to steer it towards head 1.

Mirror 5 is housed inside a corner piece 6 on column 4, the said corner piece 6 being provided with a first tubular appendix 7 parallel to the Z axis. Appendix 7 is connected, in rotary manner, to the bottom end of column 4 and turned around the Z axis by a motor (not shown) and relative drive 8. Piece 6 is also provided with a second tubular appendix 9 parallel to the XY plane. Appendix 9 is connected, in rotary manner, to tubular appendix 10 which is coaxial with appendix 9 and extends radially from focusing head 1. The latter is turned around the axis of appendix 9 by motor 11, the output pinion 12 of which engages with gear 13 integral with head 1. Travel of head 1 in relation to sheet 3 along a given cutting line is controlled by a computer (not shown) which ensures head 1 is maintained perpendicular, at all times, to the cutting point on the surface of sheet 3.

Figure 2:
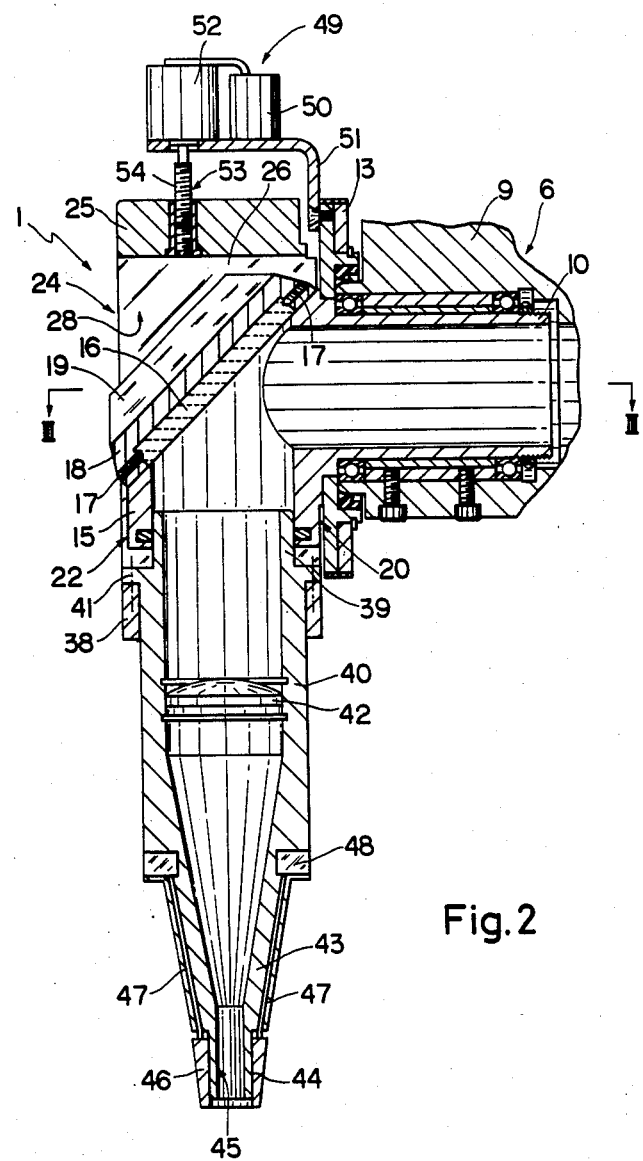
FIG. 2 shows an enlarged axial section of a detail in FIG. 1.
Figure 3:
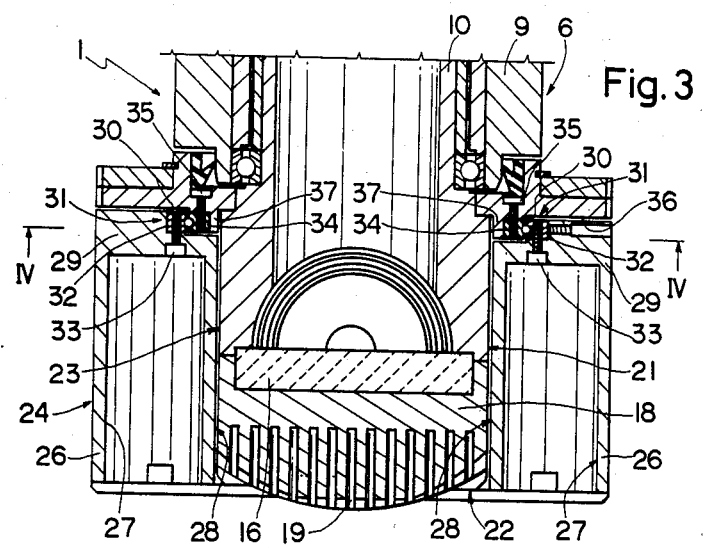
FIG. 3 shows a cross-sectional view along line III—III in FIG. 2.

As shown, particularly in FIGS. 2 and 3, appendix 10 extends radially from a tubular body 15 the top end of which is truncated, on the opposite side to that connected to appendix 10, and closed off by a mirror 16 fitted by means of screws 17 to a frame 18 provided externally with a finned radiator 19.

Tubular body 15 has an essentially square external section defined by four flat side surfaces 20, 21, 22, and 23. Appendix 10 extends from surface 20 between surfaces 21 and 23 and opposite surface 22. Tubular body 15 is mounted, in sliding manner, inside an essentially U-shaped hollow body 24 comprising a curved top part 25, with its concave side facing downwards, and two side walls 26. Each of the latter has a cavity 27 and is limited internally by a flat surface 28 connected to surface 21 or 23.

Figure 4:
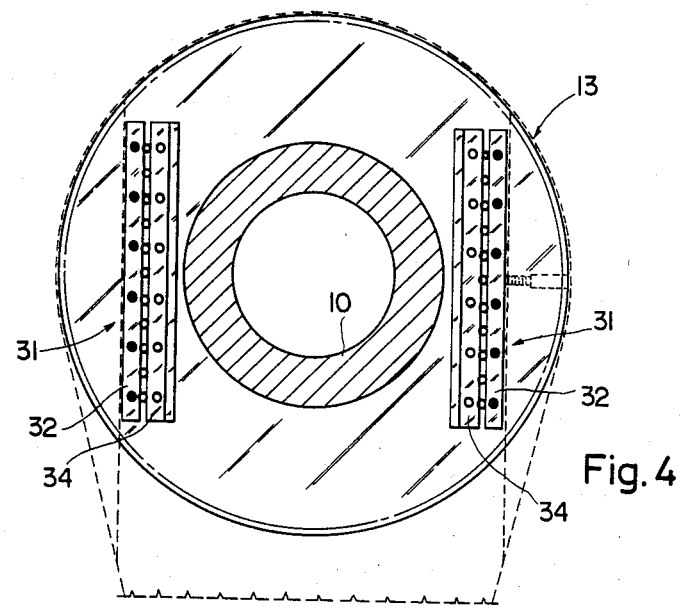
FIG. 4 shows a cross-sectional view along line IV—IV in FIG. 3.

On the side facing piece 6, each cavity 27 is closed off by a wall 29 the outer surface of which lies essentially in the same plane as surface 20 and has, adjacent to the latter, a longitudinal recess 30. The latter houses a ball guide 31, shown in more detail in FIG. 4, a first gib 32 of which is connected to wall 29 by screw 33 and a second gib 34 of which is connected by screws 35 to the end surface 36 of gear 13 and contacting rib 37, on surface 36, extending parallel to the axis of tubular body 15.

Body 24 comprises a ring 38 having an essentially square outer section and the distance of which from wall 25 is greater than the length of body 15. Ring 38 is integral with the bottom ends of walls 26 and is located underneath the bottom end of tubular body 15. The latter is connected to a tubular appendix 39 extending axially upwards from a tubular body 40 provided at the top with an annular outer flange 41 extending slackly between the bottom end of tubular body 15, and the top end of ring 38 to which it is integrally connected. Tubular body 40 supports internally a crosswise focusing lens 42 and is fitted at the bottom end with an integral output nozzle 43. The latter is essentially in the shape of a truncated cone and is fitted, on its free end, with a cylindrical end piece 44 having an axial, cylindrical through hole 45 and fitted, in axially sliding manner, with an extremely small, sliding-contact, tubular sensor 46.

Sensor 46, which could be replaced by a sliding-contact stylus of any type or shape, or by an inductive or capacitive proximity position sensor, is slightly longer than end piece 44 and projects over the end of it so that, in addition to acting as a position sensor, it also acts as a guide for the cover gas coming out of nozzle 43 through hole 45.

In the example shown in FIG. 2, sensor 46 is connected, by filaments 47 extending along nozzle 43, to a "strength gauge" measuring device 48. The output signals from device 48 depend on the positions assumed by sensor 46 in relation to a mid position on piece 44, when the tip of sensor 46 is arranged contacting sheet 3, and control a servomechanism 49 by means of circuitry not shown on the drawing and housed inside cavities 27.

The said servomechanism comprises a logic unit 50 supported by a bracket 51 over wall 25 and anchored to gear 13. On one side, unit 50 is designed to receive an electric signal supplied by the said circuitry (not shown) and proportional in size and sign to the real distance, at each instant, between a given position of sensor 46 and a given "balance" position of piece 44, the matching of the latter with the said position of sensor 46 corresponding to a zero position at which the supplied signal is zero.

Servomechanism 49 also comprises a linear actuator 52 supported by bracket 51 and provided with an output rod 53 parallel to the axis of tubular body 15. Rod 53 has a threaded end 54 to which are secured body 24, appendix 39, tubular body 40, lens 42 and nozzle 43, all of which may be moved axially in relation to body 15 from a raised position, in which flange 41 contacts the bottom end of body 15, to a lowered position, essentially as shown in FIG. 2, by travelling a few millimeters, at most equivalent to the difference between the length of tubular body 15 and the distance between part 25 and ring 38.

When operated, head 1 is moved by column 4 along a given path, with the assistance of a computer (not shown), so as to cut any type of drawn sheet along a given cutting line. During cutting, head 1 is kept with its sensor 46 contacting sheet 3 and its nozzle 43 essentially in the said zero position in which the focus on lens 42 moves along a given reference plane of sheet 3. This is made possible by servomechanism 49 which, without interfering in any way with the travel controlled by the said computer (not shown), picks up continuously, with the aid of sensor 46 in sliding contact with sheet 3, the distance between the surface of the sheet and lens 42.

When sensor 46 moves into the said zero position, this distance corresponds exactly with the focal distance of lens 42 plus a constant value equal to the distance, if any, between the said surface and the said "reference plane" on sheet 3 being cut (usually the mid plane on the sheet).

When column 4 is guided correctly and head 1 positioned equally correctly by the said computer, sensor 46 only departs from the said zero position when sheet 3 being cut presents defects, not taken into account in the computer programme, along the cutting line. Each of the said defects is accompanied by a tendency on the part of the focus on lens 42 to move away from the "reference plane" on the sheet being cut. This tendency, however, is cancelled, as soon as it arises, by unit 50 which, by activating actuator 52, moves lens 42 axially so as to keep its focus in the optimum position in relation to sheet 3 being cut.

A noteworthy feature of sensor 46 is that, on account of its mass being practically zero, it is able to slide at all times essentially contacting sheet 3 and at such low contact pressure as to make the danger of crawling practically negligible. By sliding essentially on contacting sheet 3, sensor 46 minimizes at all times the size of the gap through which cover gas may leak, thus ensuring the formation of an optimum blade-like flow of gas contacting the sheet. In addition to improving the quality of the cut, such a blade-like flow also sustains sensor 46 hydrostatically so as to essentially eliminate any danger of crawling.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A focusing head for a laser-beam cutting machine, comprising:

a focusing moving structure;

a focusing lens and an output nozzle, integral with each other, and being connectable to the said structure so as to move, in relation to the same, around two axes combining to form an angle, so as to move the said nozzle along any path and keep the center of said lens, in operation, at a given constant theoretical distance from the surface of the sheet material being cut; wherein the said head comprises a first and second portion moving, in mutual manner, axially parallel to the optical axis of the said lens and to the axis of the said nozzle;

one of the said two portions comprising the said nozzle, the said lens and sensor means for sensing the distance of the center of said lens from the said surface of the sheet material;

a servomechanism, controlled by the said sensor means, said servomechanism being mounted between the said two portions for moving them mutually in the said axial direction, so as to keep the center of said lens, in operation, at at given constant real distance from the said surface of the said sheet material;

the said sensor means comprising a sliding-contact sensor mounted in axially sliding manner onto the output end of the said nozzle and projecting from it so as to slide in operation essentially contacting the said sheet material.

2. The focusing head according to claim 1, wherein the said sliding-contact position sensor is tubular in shape and acts as a guide for a cover gas coming out, in operation, from the said nozzle.

3. The focusing head according to claim 2, wherein the said nozzle comprises an output end portion consisting of a cylindrical piece; the said position sensor being connected in sliding manner to the outer surface of the said piece.

4. The focusing head according to claim 3, wherein the said position sensor is longer than the said cylindrical piece.

5. The focusing head according to claim 1, wherein the first of the said two portions comprises a tubular body coaxial with the said nozzle; the second of the said portions being mounted in sliding manner on to the said tubular body along guides integral with the latter.

6. The focusing head according to claim 5, wherein the said tubular body is fitted with an integral gear for turning it around one of the said two axes, the said guides being integral with an end surface on the said gear.

* * * * *